United States Patent
Delves

(10) Patent No.: US 8,371,323 B2
(45) Date of Patent: Feb. 12, 2013

(54) METHOD AND APPARATUS FOR TRANSPORTING A PARTICULATE MATERIAL

(75) Inventor: James Edward Delves, Bristol (GB)

(73) Assignee: DPS Bristol (Holdings) Ltd, Bristol (GB)

(*) Notice: Subject to any disclaimer, the term of this patent is extended or adjusted under 35 U.S.C. 154(b) by 344 days.

(21) Appl. No.: 12/674,736

(22) PCT Filed: Aug. 21, 2008

(86) PCT No.: PCT/GB2008/002834
§ 371 (c)(1),
(2), (4) Date: Jun. 7, 2010

(87) PCT Pub. No.: WO2009/027635
PCT Pub. Date: Mar. 5, 2009

(65) Prior Publication Data
US 2010/0252120 A1 Oct. 7, 2010

(30) Foreign Application Priority Data

Aug. 24, 2007 (GB) .................................. 0716664.8

(51) Int. Cl.
*E03B 11/00* (2006.01)
*F16K 21/18* (2006.01)
*F16K 31/18* (2006.01)
*B01D 3/42* (2006.01)
*E03C 1/046* (2006.01)
*F17D 1/00* (2006.01)

(52) U.S. Cl. ............ 137/1; 137/268; 137/386; 137/395; 137/433

(58) Field of Classification Search .............. 137/1, 268, 137/397, 398, 403, 395, 428, 429, 430, 433, 137/489, 386
See application file for complete search history.

(56) References Cited

U.S. PATENT DOCUMENTS

| | | | | |
|---|---|---|---|---|
| 848,929 A | * | 4/1907 | Smith | ........................... 137/397 |
| 2,389,616 A | * | 11/1945 | Godfrey | ....................... 451/100 |
| 2,666,671 A | | 1/1954 | Kimmerle | |

(Continued)

FOREIGN PATENT DOCUMENTS

| | | |
|---|---|---|
| CN | 1053410 A | 7/1991 |
| DE | 1277745 B | 9/1968 |
| DE | 4142916 C1 | 7/1993 |
| EP | 0819629 A1 | 1/1998 |

(Continued)

OTHER PUBLICATIONS

Office Action for Chinese application No. 200880104169.4 dated Jul. 4, 2012.

(Continued)

*Primary Examiner* — Stephen M Hepperle
*Assistant Examiner* — Frederick D Soski
(74) *Attorney, Agent, or Firm* — Honigman Miller Schwartz and Cohn LLP

(57) ABSTRACT

Fluidizing transport apparatus comprises a hopper, a pressure vessel and a valve element which controls a port between the hopper and the vessel. The valve element is retained closed against the port under pressure within the vessel. A fluidizing nozzle receives transport fluid, such as water from a fluid line. Water supplied through the fluid line thus fluidizes solids in the vessel and raises the pressure to maintain the valve element in the closed position. The fluidized solids material is then supplied to a transport pipeline from the vessel. Solids material loaded into the hopper depress the valve element when pressure within the vessel is relieved, so allowing a fresh charge of the solids material to enter the vessel for a subsequent cycle. The position of the valve element within the vessel is influenced by a float which responds to the water level within the hopper.

22 Claims, 7 Drawing Sheets

U.S. PATENT DOCUMENTS

| | | | | |
|---|---|---|---|---|
| 2,683,622 A | * | 7/1954 | Dragon | 422/276 |
| 3,185,529 A | * | 5/1965 | Davies et al. | 406/126 |
| 3,603,339 A | | 9/1971 | Swain | |
| 4,114,954 A | | 9/1978 | Pasieka et al. | |
| 4,243,066 A | * | 1/1981 | Lambie | 137/202 |
| 4,952,099 A | | 8/1990 | Drobadenko et al. | |
| 4,978,251 A | | 12/1990 | Drobadenko et al. | |
| 5,853,266 A | | 12/1998 | Parkinson et al. | |

FOREIGN PATENT DOCUMENTS

| | | |
|---|---|---|
| GB | 1243473 A | 8/1971 |
| WO | WO-2007015091 A1 | 2/2007 |

OTHER PUBLICATIONS

International Search Report for PCT/GB2008/002834 dated Nov. 7, 2008.

\* cited by examiner

METHOD AND APPARATUS FOR TRANSPORTING A PARTICULATE MATERIAL

FIELD OF INVENTION

The present invention relates to apparatus for transporting a particulate material.

BACKGROUND TO THE INVENTION

Hydro-transport, or the transport of particulate materials in slurry form, usually entrained in a flow of water, is used in the mining and mineral industries. The material is fluidized in batches and conveyed along pipelines. Such processes can be used in many other industries where solids are moved, such as filtration, water softening, catalyst regeneration and grit or shot blasting systems.

Fluidizing transport systems in which the material to be transported is fluidized in a pressure vessel and then discharged from the vessel under fluid pressure are disclosed in U.S. Pat. No. 4,978,251, U.S. Pat. No. 4,952,099, U.S. Pat. No. 5,853,266 and WO2007015091. Such systems are capable of transporting slurries from the pressure vessel at much higher solids concentrations than a traditional slurry pump, are more energy efficient, and have the advantage that no moving parts come into contact with the solids.

The problem with these fluidizing systems is that, owing to the high concentrations of solids and the speed of transfer of the solids from the pressure vessel into the transport pipeline, the vessel must be replenished with solids rapidly to keep up with the discharge. This requires the vessel to be depressurized and solids loaded, normally under gravity, into the top of the vessel. In order to load quickly, the pressure vessel has a fill valve or port which is generally a minimum 4 times larger than the discharge pipe. The valve must be quick-acting, pressure-retaining and solids tolerant, and be capable of undergoing several hundred thousand operating cycles. Valves on large-scale systems may be 1 meter diameter or greater.

The above constraints are generally beyond the normal operating limits of many valves. A valve capable of this duty is generally large and expensive making the use of fluidizing transport systems uneconomical.

Hard seat ball valves or plug valves can be used, but the operating conditions and abrasive nature of the solids cause rapid wear of valve seats and seals, necessitating a high level of maintenance.

Owing to the size of the valves, the actuators which drive them are equally large and require frequent maintenance. The plant must be taken out of service during maintenance work, resulting in down time and lost production, together with associated costs.

Pinch valves are known to be solids tolerant and can be pneumatic or mechanically operated; however, they do not have a high pressure capability, have a limited size, and so are not suitable except on low pressure low volume systems.

Knife valves, whilst generally smaller in depth, can be used but again require an actuator and have a limited operating pressure. The seals employed in knife valves are generally not suitable for continuous cyclic operation.

Fluidization hydro-transport systems rely generally on a flooded pressure vessel and a solids accumulation hopper located above, and operate as follows. While the hopper is being loaded with solids, the standing fluid within the hopper is displaced from the hopper via an overflow pipe. When the hopper has been filled with solids, water will be present in the hopper within the voidage of the solids. The transport fluid is usually water. Consequently, it will be referred to as water in this specification but it will be appreciated that other fluids, usually liquids can be used.

Water as the transport fluid is fed into a fluidizing unit within the pressure vessel, the fluid displacing the solids present in the pressure vessel until all the solids are discharged. This leaves the vessel full of water.

When the pressure vessel is empty of solids the valve between the hopper and vessel is opened and solids fall by gravity into the pressure vessel. Water within the vessel is displaced by the higher density solids entering the vessel. This results in solids falling through a counter-flow of water rising through the valve opening from the vessel, which can hold up or restrict the loading of solids.

To overcome this, a separate displacement or bypass line complete with a simple shut-off valve can be provided, extending from the top of the vessel to the top of the hopper. This allows the majority of displaced water to bypass the large solids loading valve. This reduces the counter-flow of water through the valve to allow the solids to fall into the vessel unhindered which speeds up the loading time. In all cases the hopper and vessel are in a flooded state either before or after loading.

Once the vessel is loaded, the valves around the vessel are closed, and feed to the fluidizing head is opened. This feeds water into the vessel via the fluidizing head and brings the vessel up to working pressure, normally within 1 or 2 seconds. The solids then discharge as slurry into a transport pipeline.

SUMMARY OF INVENTION

According to the present invention there is provided apparatus for transporting a particulate material, the apparatus comprising a vessel and a hopper for the particulate material, the hopper being situated above the vessel and communicating with the vessel at a port which is closeable by a valve element, the vessel having a liquid feed inlet for admitting liquid under pressure into the vessel, and an outlet for discharging a fluidized mixture of the liquid and the particulate material, the valve element being provided with a floatation device which biases the valve element upwards in the liquid, the floatation device being provided in the hopper and being connected to the valve element by a connecting element which extends through the port.

According to another aspect of the present invention there is provided a method of transporting a particulate material comprising:
 (a) delivering the particulate material to a hopper which communicates through a port with a vessel situated below the hopper and containing a transport fluid, the port being closed by a valve element, which is buoyant by virtue of a float disposed in the hopper and connected to the valve element, whereby the position of the valve element is influenced by the level of fluid in the hopper;
 (b) allowing the valve element to move under the weight of particulate material in the hopper to open the port, whereby the particulate material falls through the port into the vessel;
 (c) admitting further transport fluid into the vessel thereby pressurizing the transport material and causing the valve element to move to close the port;
 (d) opening a transport valve to allow fluid within the vessel to flow to a pipeline; and (e) fluidizing the particulate material in the transport fluid whereby the particulate material is entrained in the transport fluid delivered to the pipeline.

BRIEF DESCRIPTION OF DRAWINGS

For a better understanding of the present invention, and to show more clearly how it may be carried into effect, reference will now be made, by way of example, to the accompanying drawings, in which.

DETAILED DESCRIPTION OF THE INVENTION

Figure 1:
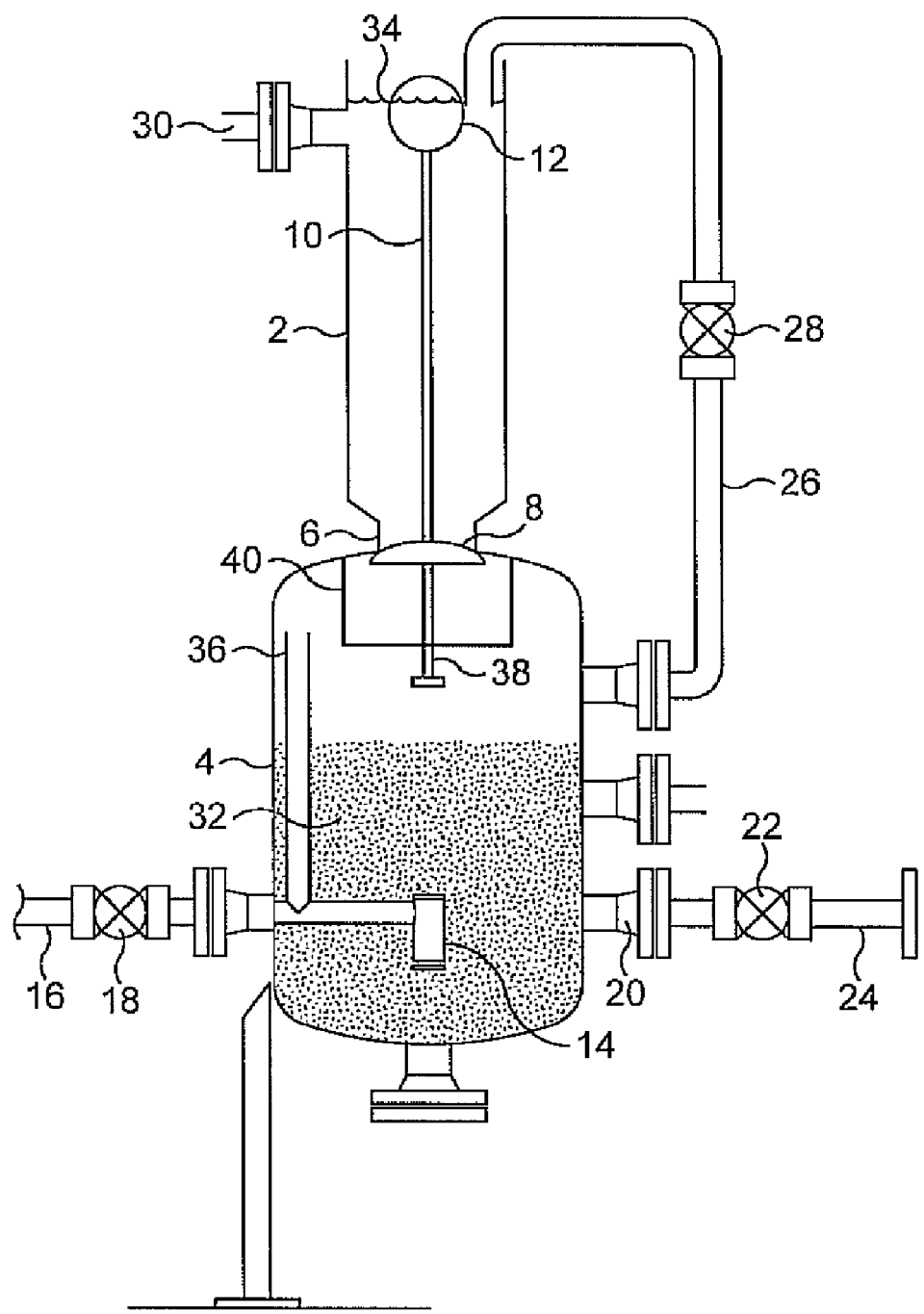
FIG. 1 is a diagrammatic view showing fluidizing transport apparatus.
Figure 2:
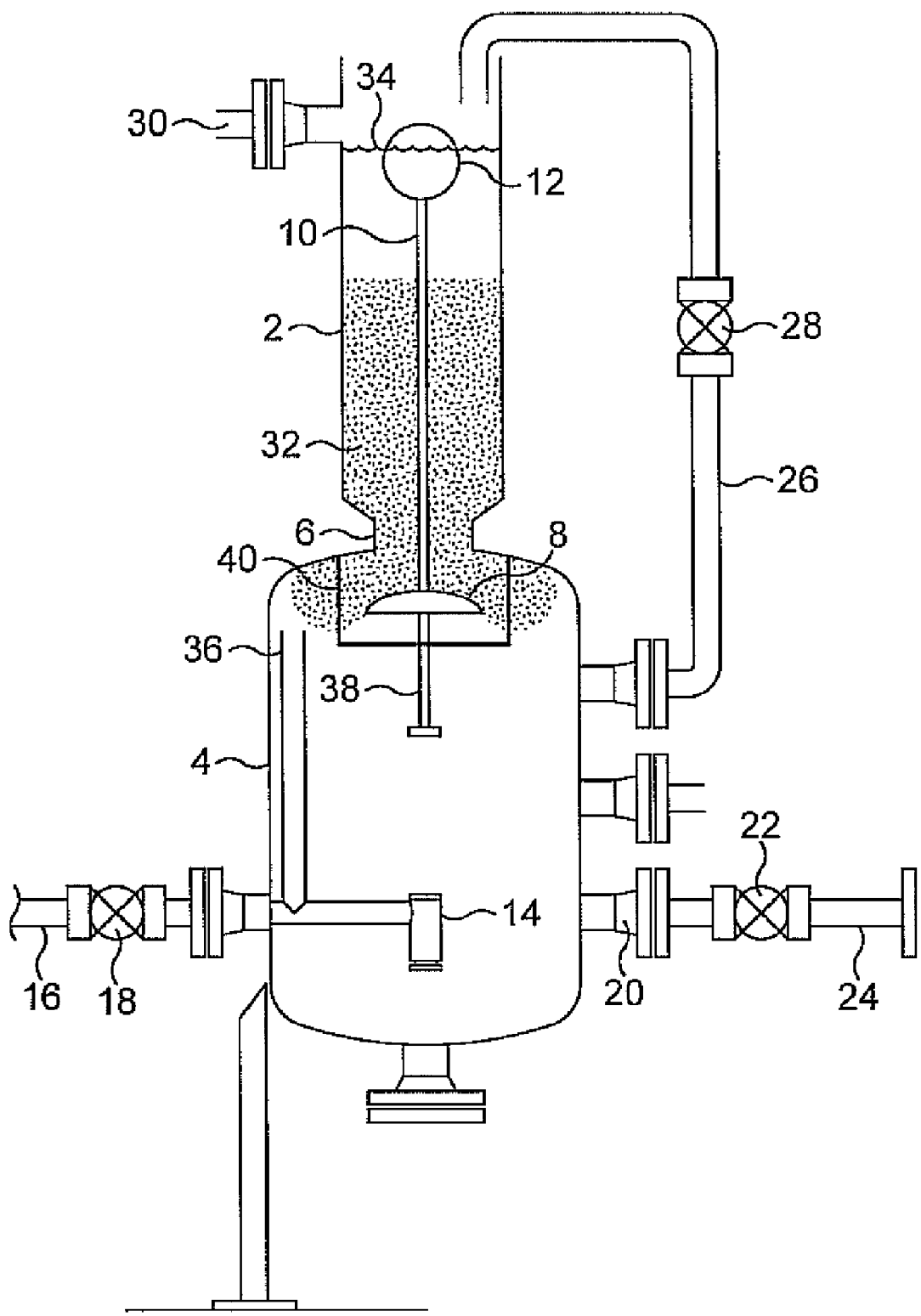
FIG. 2 corresponds to FIG. 1 but shows the apparatus in a different operating condition.

Referring to FIGS. 1 and 2, the apparatus comprises a hopper 2 for receiving a solid material, such as sand or other particulate material. The hopper may be loaded with the solid material by conventional means, such as a screw conveyer (not shown). Beneath the hopper 2 there is a pressure vessel 4. The hopper 2 communicates with the pressure vessel 4 through a port 6. The port may be closed by a valve element 8 which is mounted on a connecting rod 10 which extends through the port 6 and is provided with a flotation device in the form of a closed spherical float 12.

A fluidizer nozzle 14 is situated within the vessel 4, towards it lower end, and is connected to a fluid feed inlet 16 by a shut-off valve 18.

A slurry outlet 20 is provided generally at the same level as the feed inlet 16, i.e. towards the lower region of the vessel 4 and is connected by an outlet shut-off valve 22 to a transport pipeline 24.

A bypass or displacement line 26, provided with a bypass shut-off valve 28, extends from the upper region of the vessel 4 to discharge into the top of the hopper 2.

The hopper 2 is provide at its upper region with an overflow outlet 30.

In the conditions shown in FIG. 1, the vessel 4 contains a load of the solid material 32, the remainder of the vessel 4 being filled with a transport fluid which, in all of the embodiments described with reference to the Figures, is water.

The valve 8 is shown closed, being biased upwardly by a float 12 which floats in a body of water contained in the hopper 2. The level 34 is temporarily above the level of the overflow 30, because the hopper 2 has received water from the vessel 4, through the bypass line 26, displaced by the incoming solids 32.

When the apparatus reaches the condition shown in FIG. 1, the bypass valve 28 is closed, and the inlet valve 18 and the outlet valve 22 are opened. This causes the pressure within the vessel 4 to rise, maintaining the valve 8 in the closed position. Thus, even though the water level 34 in the hopper 2 will fall as excess water drains through the overflow outlet 30, the pressure in the vessel 4 is sufficient to maintain the valve element 8 closed against the port 6.

Incoming flow through the feed 16 is delivered to the fluidizing nozzle 14 and also through a balance pipe 36 to a position near the top of the vessel 4. The flow through the fluidizing nozzle 14 fluidizes the particulate solids material 32, and the fluidized material, in the form of a slurry, is discharged through the slurry outlet 20 to the transport pipeline 24. This operation continues until all of the solids material in the vessel 4 has been discharged. While the discharge is occurring, the next batch of the solids material is loaded into the hopper 2.

When discharge of the solids material 32 is complete, the inlet valve 18 and the outlet valve 22 are closed and the bypass valve 28 is opened. Pressure in the vessel 4 is thus relieved through the bypass line 26, reducing the upwards pressure acting on the valve element 8. The weight of the solids material loaded into the hopper 2 is greater than that of water, and consequently this weight, acting on the valve element 8 is sufficient to move the valve element 8 downwardly, as shown in FIG. 2, allowing the solids 32 to fall from the hopper 2 into the pressure vessel 4. As mentioned above, this causes water to be displaced from the vessel 4 through the bypass line 26 into the hopper 2, replacing the departing solids material. The connecting rod 10 extends through the valve element 8 to form a guide rod 38 which cooperates with a guide element 40, secured to the wall of the vessel 4, to maintain the central positioning of the valve element 8. As the solids material 32 falls through the port 6, it acts on the valve element 8 to displace it lower in the vessel 4. Also, in the transient state as water is displaced from the vessel 4 through the bypass line 26 to the hopper 2, the water level 34 drops below the level of the overflow outlet 30 and this contributes to lowering of the valve element 8 and increased opening of the port 4.

In addition, the port 6 has a diameter larger than that of the slurry outlet 20, for example at least four times the diameter. Consequently, the transfer of the solids material 32 from the hopper 2 to the vessel 4 takes place rapidly, minimizing the time between the discharge of successive batches of the material 32 to the transport pipeline 24.

When the transfer of the material 32 from the hopper 2 to the vessel 4 is complete, the bypass valve 28 is closed and the inlet valve 18 and the outlet valve 22 are opened. As water begins to flow into the vessel 4, a proportion of it flows through the balance pipe 36. Consequently, a supply of clean water flows into the region of the valve 8, and through the port 6 in the upward direction, so scouring any remaining solids material from the upper surface of the valve element 8. This flow, along with the displacement flow through the bypass line 26, raises the level 34 in the hopper 2 as mentioned above. The float 12 therefore rises to move the valve element towards the port 6, assisted by the pressure differential across the port 6 caused by the incoming flow into the vessel 4. The port 6 is thus closed by the valve element 8, and the process repeats in the manner described above with reference to FIG. 1.

It would be appreciated that, if a single fluidizing unit is provided, comprising the hopper 2 and the vessel 4, the delivery of fluidized slurry to the transport pipeline 24 will take place in a batch like manner. In one embodiment, therefore, a pair of the fluidizing units is provided, as diagrammatically represented in FIG. 3. In this arrangement, a connecting manifold 42 is provided which comprises a common outlet 44 connected to the transport pipeline 24 (not shown). The manifold 42 has a pair of inlet sections 46, 48, connected respectively to the slurry outlets 20 of two vessels, vessel A and vessel B.

Figure 3:
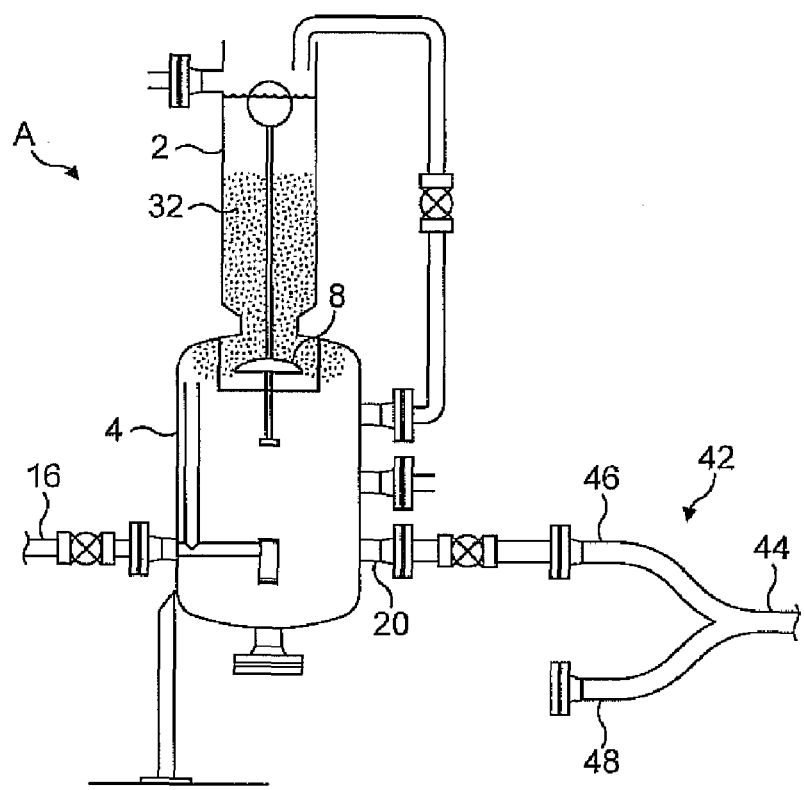
FIG. 3 diagrammatically shows two fluidizing units operable in the same fluidized transport.
Figure 3:
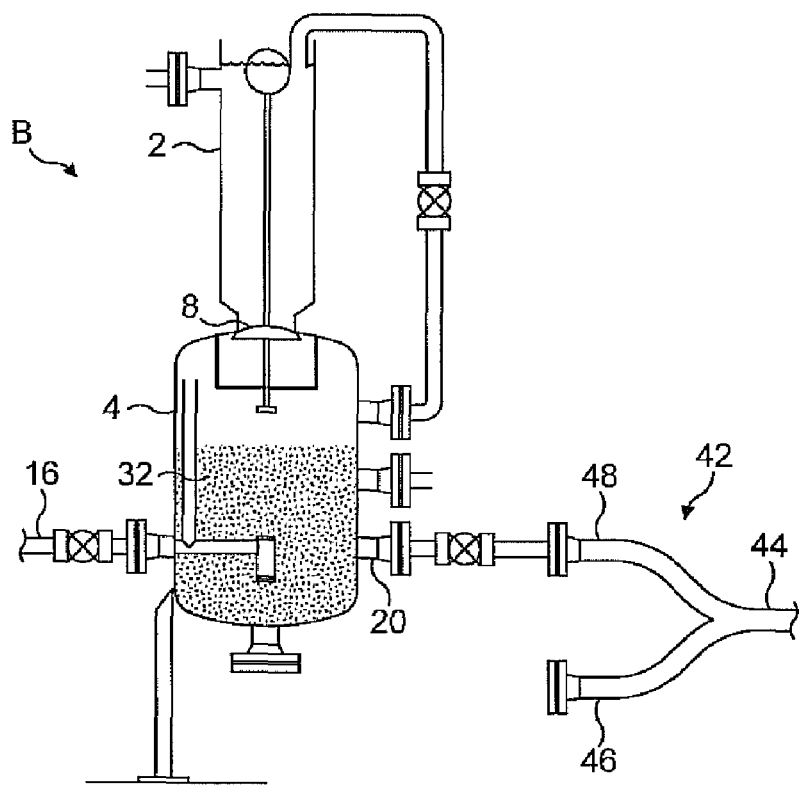

The fluidizing units represented by vessel A and vessel B in FIG. 3 are identical to that shown in 1 and 2 and so will not be described again in detail. However, in operation of the apparatus as shown in FIG. 3, it will be appreciated that, while vessel A is receiving solids material 32 from the hopper 2 through the open valve element 8, the pressure vessel 4 of vessel B is receiving water through the inlet fluid line 16 to discharge the solids material 32 through the slurry outlet 20, the respective inlet section 48, and the outlet 44.

In FIG. 1 to 3, the float 12 is shown fixed on the upper end of the connecting rod 10. As an alternative, it is possible for the float 12 to be mounted displaceably on the connecting rod 10, so that its position relative to the valve element 8 can be adjusted. This adjustment enables the position of the valve element 8 to the port 6 to be varied, to provide an optimum operating characteristic in terms of the maximum opening position of the valve element 8 to allow rapid discharge of material from the hopper 2 to the vessel 4, and the time taken for the valve element to close against the port 6 when water entering the vessel 4 through the feed line 16 raises the pressure within the vessel 4.

Figure 4:
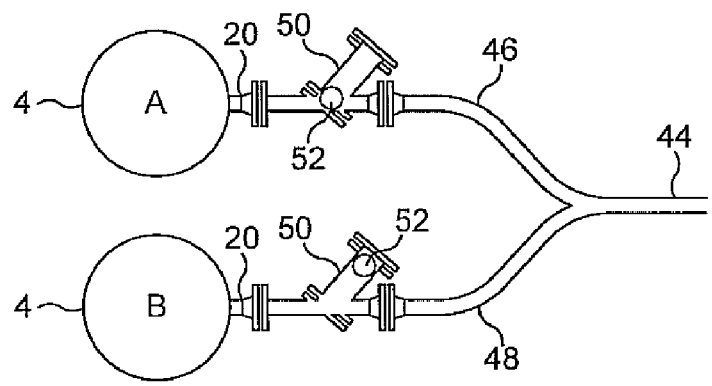
FIG. 4 is a plan view of one connection arrangement for apparatus as shown in FIG. 3.
Figure 5:
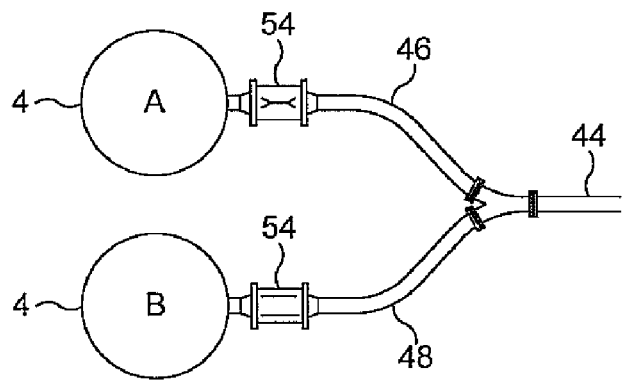
FIG. 5 corresponds to FIG. 4 but shows an alternative connection arrangement.
Figure 6:
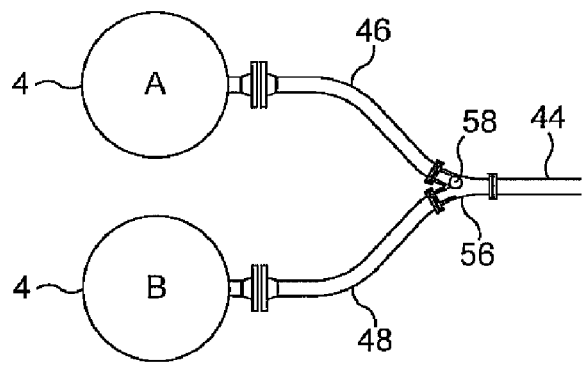
FIG. 6 corresponds to FIGS. 4 and 5 but shows a third embodiment of connection arrangement.

Although not shown in FIG. 3 a non-return valve arrangement is required in the manifold 42 to prevent backflow of slurry from the discharging vessel 4 to the other loading vessel 4. FIGS. 4 to 6 to show various valve arrangements which can be used.

In FIG. 4, all check valves 50 are employed in the inlet sections, 46, 48. The valves 50 are oriented so that the valve wall 52 is biased by gravity to a position in which it closes the inlet section 46, 48. Thus, the slurry flow from the vessel 4 which is discharging (vessel B) in the slurry flow from the vessel 4 which is discharging (vessel B in the conditions shown in FIG. 4) causes the ball 52 to be displaced out of the fluid path, allowing the slurry to pass to the outlet 44. Since the interior of the loading vessel 4 (vessel A in the condition shown in FIG. 4) is atmospheric, and consequently the elevated pressure in the inlet section 46 presses the ball 52 against its seat, preventing slurry from vessel B from returning through the inlet section 46 to the vessel A.

FIG. 5 shows an alternative embodiment in which the ball valves 50 are replaced by pinch valves 54. In this embodiment, control means are required to open and close the pinch valves 54 at the appropriate times. In the conditions shown in FIG. 5, vessel B is discharging, and the respective pinch valve 54 is open, while vessel A is loading, and the respective pinch valve 54 is closed to prevent back-flow in into it. Whereas the ball valves of FIG. 4 can be used in high-pressure systems, and do not require positive activation, the pinch valves 54 of FIG. 5 are suitable for only relatively low-pressure systems and require actuators, for example, hydraulic, pneumatic or mechanical actuators, controlled by a suitable control arrangement.

FIG. 6 shows a single ball diverter valve 56, comprising a ball 58 which is mounted for pivotable displacement between the outlet ends of the respective inlet sections, 46, 48. In the conditions shown in FIG. 6, as in FIGS. 4 and 5, vessel B is discharging, while vessel A is loading. The ball 58 is thus swung, by the flow from vessel B, over the outlet end of the inlet section 46 vessel A. Consequently, backflow to the vessel A is prevented. Such diverter valves can be used in high-pressure systems and do not require actuators or associated control arrangements.

Figure 7:
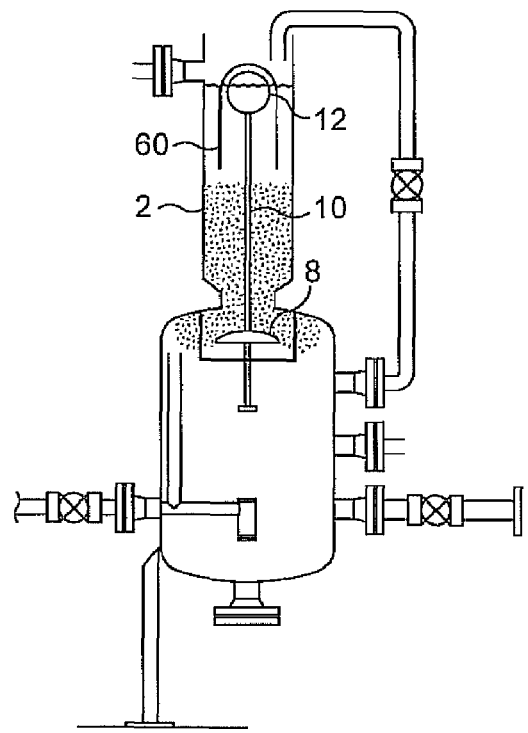
FIG. 7 corresponds to FIG. 1 but shows a modified form of fluidizing transport apparatus.

FIG. 7 shows a variant of the apparatus as shown in FIGS. 1 and 2. It would be appreciated that, in the embodiment of FIGS. 1 and 2, solids material being loaded into the hopper 2 may strike the float 12. This may damage the float 12 or depress it into the water within the hopper 2 so displacing the valve element 8 away from the port 6. In order to avoid this, a shield 60 may be supported within the hopper 2 enclosing and protecting the float 12. The shield 60 is preferably provided with a vent hole so that the water level within the shield 60 rises and falls with the water level 34 outside the shield 60. Thus, operation of float 12 is not affected, shroud 60 protects it from solids material falling into the hopper 2.

Figure 8:
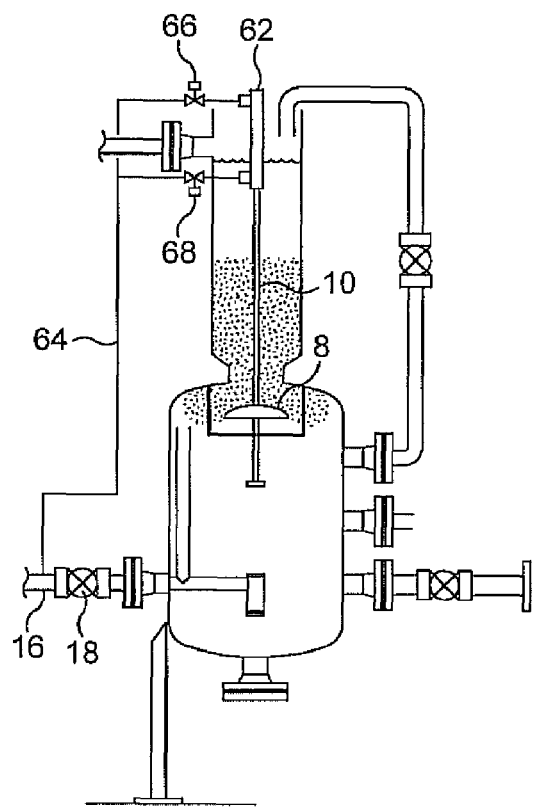
FIG. 8 corresponds to FIG. 7, but shows another modified fluidizing transport apparatus.

FIG. 8 shows an alternative arrangement for controlling the position of the valve element 8. Instead of the float 12, the variant shown in FIG. 8 employs a hydraulic ram 62. The ram 62 is supplied with water under pressure through a line 64, extending from the inlet feed line 16 at a position upstream of the inlet valve 18. The water under pressure is directed to the respective ends of the ram 62 by control valves 66, 68. Thus, to close the valve element 8 against the port 6 water is supplied through the line 66 through the open valve 68 to raise the connecting rod 10, taking with it the valve element 8. To open the valve element 8, the control valve 68 is closed and control valve 68 is opened, so that water is admitted to the upper region of the ram 62, so lowering the valve element 8. The control valves 66 and 68 may be controlled manually by an operator, or may be controlled from an automatic control system for the apparatus as a whole.

Although the use of water from the inlet feed line 16 to drive the ram 62 provides a convenient arrangement, it is possible for the ram 62 to be replaced by other forms of actuators, for example a pneumatic ram controlled by solenoids or by an electric actuator.

Figure 9:
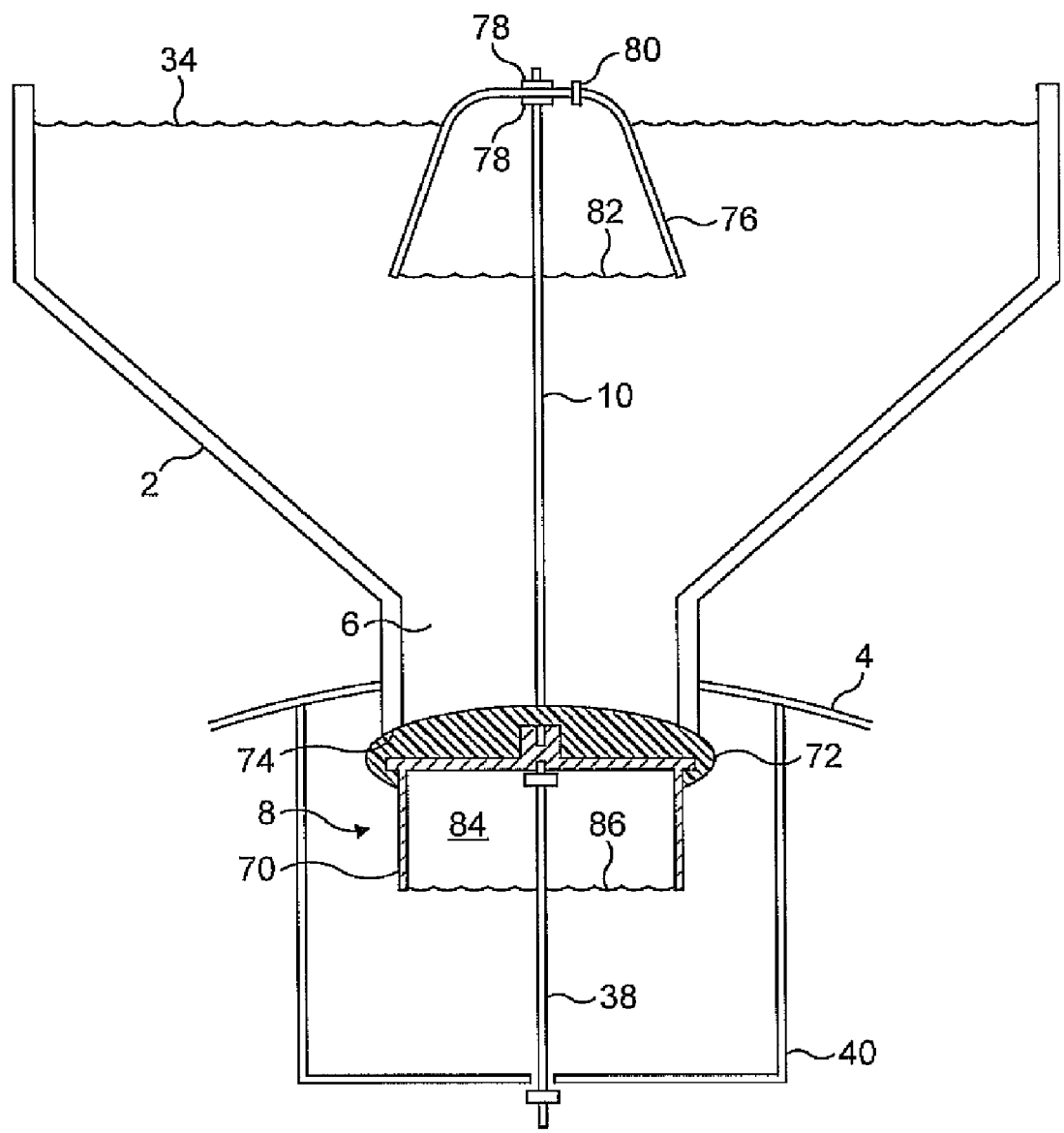
FIG. 9 is an enlarged view of an alternative embodiment of valve suitable for use in a fluidizing transport apparatus as shown in FIG. 1.

FIG. 9 shows, on an enlarged scale, an alternative embodiment of the valve element 8 and its control arrangement. The valve element 8, as shown in FIG. 9, comprises a core 70, which may be fabricated or forged from steel, which is provided with a sealing cap 72 which may be formed from an elastomeric material, such as natural rubber or polyurethane which is secured to the core 70, for example by bonding or molding in situ. Although this construction is described with specific reference to the embodiment of FIG. 9, it will be appreciated that the valve element 8 of the preceding embodiments may also be constructed in the same manner.

The cap 72 cooperates with a valve seat 74 which defines the port 6. The valve element 8 is connected by the connecting rod 10 to a floatation device in the form of an inverted bucket 76. The connecting rod 10 is screw threaded, at least at its upper end, and the bucket 76 is adjustably connected to the connecting rod 10 by adjustment nuts 78. The bucket 76 is provided with an air control valve 80 through which air can be admitted or withdrawn from the interior of the bucket 76 to adjust the position of an internal water level 82.

The core 70 of the valve element 8 defines an internal chamber 84. The core 70 may, like the bucket 76, have an air control valve similar to the valve 80, but not shown in FIG. 9. This additional air control valve enables air to be supplied to, or withdrawn from the chamber 84 to adjust the internal water level 86.

In general, the valve arrangement shown in FIG. 9 operates in a similar manner to that of FIGS. 1 and 2. However, it will be appreciated that the buoyancy of the valve assembly, comprising the valve element 8 and the bucket 76, can be adjusted by introducing air to the bucket 76 and/or the chamber 84.

This enables the behavior of the valve element 8 in operation to be adjusted to achieve desired characteristics. For example, increasing the volume of air within the bucket 76 and the chamber 84 will increase the buoyancy of the assembly, so as to decrease the time taken for the valve element 8 to move from the open position to the closed position.

It will be appreciated that such adjustment can be achieved using only the bucket 76 or only the chamber 84. It is envisaged that the chamber 84 will not be required where the valve element 8 is relatively light, although the additional buoyancy which is provided may be beneficial where the valve element has a relatively large mass.

Figure 10:
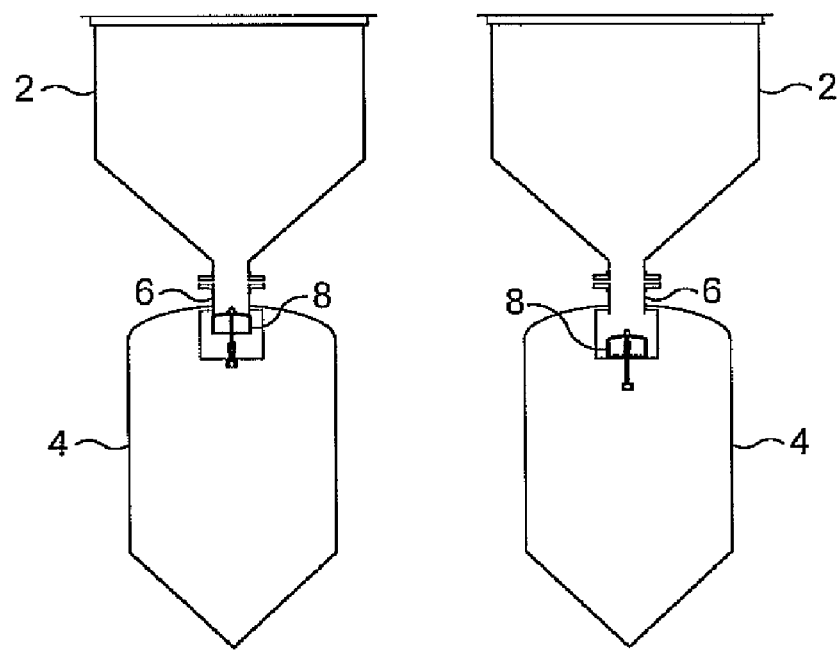
FIG. 10 corresponds to FIG. 1 but shows another embodiment of fluidizing transport apparatus.
Figure 11:
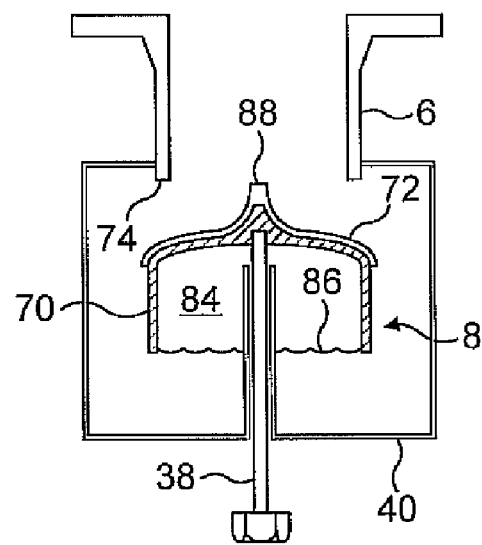
FIG. 11 is an enlarged view of a valve in the apparatus of FIG. 10.

FIGS. 10 and 11 show an embodiment similar to that of FIG. 9, although the bucket 76, and the connecting rod 10, are omitted. Thus, the valve element 8, as before, comprises a core 70 and a cap 72, but the buoyancy of the valve assembly is achieved by the chamber 84 alone. Again, an air control valve (not shown) is provided to enable air to be introduced into, or withdrawn from, the chamber 84 to adjust the internal water level 86. In the embodiment of FIGS. 10 and 11, the guide element 40 is provided with an upstanding guide tube 38 to ensure adequate guidance of the valve element 8 in the absence of the stabilizing effect provided by the float 12 or the bucket 76.

As shown in FIG. 11, the core 70 is generally cup-shaped and the cap 72 is in the form of a relatively thin layer of elastomeric or other yielding material which is bonded to the core 70. The profile of the core 70 and consequently of the cap 72 is configured to provide an upstanding peak 88 in the centre of the valve element 8, with the remainder of the upper surface of the cap 72 having a smoothly curving profile to the radially outer edge of the valve element 8. This profile assists in avoiding the accumulation of the solid material on the valve element 8. Instead, the flow of water through the port 6, once all solids have been discharged from the hopper 2, scours any deposited solid material from the valve element 8. Removal of such solid material is also assisted by the counter flow of water from the vessel 4 during the solids filling process, and the flow of incoming water through the balance pipe 36.

Preferably, the quantity of air within the chamber 84 (or within the chamber 84 and the bucket 76 when provided), is such that the entire valve assembly is approximately neutrally buoyant in the water within the vessel 4 and the hopper 2 (or other transport liquid, if used). In a specific example, it has been found that, for a valve assembly (i.e. the valve element 8, the guide rod 38 and any other components attached to the valve element 8) having a total mass of 1.25 kg, the volume of air required in the chamber 84 to achieve neutral buoyancy is 1.4 liters.

The invention claimed is:

1. Apparatus for transporting a particulate material, the apparatus comprising:
    a vessel;
    a hopper for the particulate material, the hopper being situated above the vessel;
    a port providing communication between the hopper and the vessel;
    a valve element adapted to close the port;
    a liquid feed inlet for admitting liquid under pressure into the vessel; and
    an outlet for discharging a fluidized mixture of the liquid and the particulate material,
   wherein the valve element is provided with a floatation device which biases the valve element upwards in the liquid, the floatation device being provided in the hopper and being connected to the valve element by a connecting element which extends through the port.

2. Apparatus as claimed in claim 1, in which the valve element is positioned within the vessel.

3. Apparatus as claimed in claim 1, in which the valve element is provided with buoyancy.

4. Apparatus as claimed in claim 1, in which a shield is secured within the hopper, the floatation device being situated beneath the shield.

5. Apparatus as claimed in claim 1, in which the valve element is connected to the floatation device by a rod.

6. Apparatus as claimed in claim 1, in which guide means is provided for guiding the movement of the valve element.

7. Apparatus as claimed in claim 1, in which a bypass line extends between the vessel and the hopper, a shut-off valve being provided in the bypass line.

8. Apparatus as claimed in claim 1, in which an overflow port is provided adjacent the upper end of the hopper.

9. Apparatus as claimed in claim 1, in which a fluidizing nozzle is provided within the vessel and is connected to the liquid feed inlet.

10. Apparatus as claimed in claim 3, in which the floatation device is a buoyant closed float.

11. Apparatus as claimed in claim 3, in which the floatation device is an inverted bucket.

12. Apparatus as claimed in claim 3, in which the buoyancy is provided by a chamber within the valve element.

13. Apparatus as claimed in claim 4, in which the shield includes an air vent.

14. Apparatus as claimed in claim 5, in which the distance between the valve element and the floatation device is adjustable.

15. Apparatus as claimed in claim 6, in which the guide means comprises a guide rod which is secured to the valve element and cooperates with a guide element secured within the vessel.

16. Apparatus as claimed in claim 9, in which a balance flow pipe is connected to the liquid feed inlet and extends within the vessel to discharge at a position adjacent the valve element.

17. Apparatus as claimed in claim 11, in which the inverted bucket is provided with an air control valve for adjusting the quantity of air within the bucket.

18. Apparatus as claimed in claim 12, in which the chamber is open to the interior of the vessel on its underside.

19. Apparatus as claimed in claim 12, in which the chamber is provided with an air control valve for adjusting the quantity of air within the chamber.

20. A method of transporting a particulate material comprising:
    (a) delivering the particulate material to a hopper which communicates through a port with a vessel situated below the hopper and containing a transport fluid, the port being closed by a valve element, which is buoyant by virtue of a float disposed in the hopper and connected to the valve element, whereby the position of the valve element is influenced by the level of fluid in the hopper;
    (b) allowing the valve element to move under the weight of particulate material in the hopper to open the port, whereby the particulate material falls through the port into the vessel;

(c) admitting further transport fluid into the vessel thereby pressurizing the transport material and causing the valve element to move to close the port;
(d) opening a transport valve to allow fluid within the vessel to flow to a pipeline; and
(e) fluidizing the particulate material in the transport fluid whereby the particulate material is entrained in the transport fluid delivered to the pipeline.

21. A method as claimed in claim 20, in which, in step (b), fluid displaced from the vessel by the particulate material is conveyed to the hopper by a bypass line.

22. A method as claimed in claim 20, in which the valve element is buoyant in the transport fluid.

* * * * *